United States Patent [19]
Totten

[11] 3,911,345
[45] Oct. 7, 1975

[54] ADAPTIVE CONTROL SYSTEM USING COMMAND TAILORING

[75] Inventor: Donald R. Totten, Ventura, Calif.

[73] Assignee: The United States of America as represented by the Secretary of the Navy, Washington, D.C.

[22] Filed: June 4, 1973

[21] Appl. No.: 367,086

[52] U.S. Cl. ............ 318/561; 244/77 M; 235/150.1
[51] Int. Cl.² ......................................... G05B 13/00
[58] Field of Search .................. 318/561; 244/77 M; 235/150.1

[56] References Cited
UNITED STATES PATENTS

| | | | |
|---|---|---|---|
| 3,412,299 | 11/1968 | Buscher et al. | 318/561 |
| 3,435,422 | 3/1969 | Gerhardt et al. | 318/561 X |
| 3,446,946 | 5/1969 | Andeen | 318/561 X |
| 3,633,086 | 1/1972 | Speth | 318/561 X |
| 3,758,762 | 9/1973 | Littman | 318/561 X |

Primary Examiner—B. Dobeck
Attorney, Agent, or Firm—R. S. Sciascia; G. J. Rubens; T. M. Phillips

[57] ABSTRACT

An adaptive control system for the tailoring of outer loop error command signals so that established performance capabilities of inner loop elements are not exceeded. Self-adaptive optimal response control is accomplished by monitoring instrumented signal levels and derivatives, comparing these to component limitations and adjusting all outer error signal gains proportionally to allowable signal level. This technique can be used on either proportional or bang/bang control. The sequential incorporation of error command signal tailoring, moving out from inner elements to inner loops to succeeding outer control loops in high gain multiple feedback control systems provides a very practical means of implementing a self-adaptive control system which optimizes performance within physical hardware constraints and under conditions involving extreme variations in intrinsic gains command activity or signal levels, and noise influences.

9 Claims, 2 Drawing Figures

FIG. I

ADAPTIVE CONTROL SYSTEM USING COMMAND TAILORING

BACKGROUND OF THE INVENTION

The ever increasing requirements associated with guided missile design have high lighted the need for simple low cost automatic stabilization and control systems which have the ability to perform in extreme variations of operational and environmental conditions. For the most part a semi-empherical approach has been followed using model formulation on an analog computer, as for example, the method and apparatus disclosed in U.S. Pat. No. 3,221,230 to P. V. Osburn. This approach has not been found to be satisfactory.

SUMMARY OF THE INVENTION

The present invention provides an adaptive control system for tailoring command or reference signals proportionally to available control actuator and sensor instrument acceleration rate and position capabilities. The invention can be used in a variety of applications, however, it has been developed and demonstrated in conjunction with guided missle airframe attitude control. In the guided missle applications wherein error signals are generated by comparing seeker attitude guidance or reference command signals with achieved attitude and control actuator deflection signals, the invention provides a means for generating adaptive control signals for tailoring the gain of the required command signals so that the capabilities of the control actuator, airframe and sensors are not exceeded.

The performance of the present invention has been demonstrated by both analog computer modeling and multiple guided missile hardware implementation and flight test. In the case of the Modular ASM missile application self-adaptive optimal response control is achieved in roll attitude position and pitch and yaw attitude rate. Differential control actuator shaft displacements are generated proportionally to differences between the commanded reference roll attitude and the measured roll attitude as sensed by a roll free gyro. Combined control actuator shaft displacements are generated proportionally to differences between command and measured pitch rate or yaw rate seeker and rate gyro output signals. Adaptive gain control is implemented by attenuating actuator position command proportionally to available actuator acceleration and rate capabilities.

OBJECTS OF THE INVENTION

An object of the invention is to provide a simple low cost automatic stabilization and control system which has the ability to perform over extreme variations of operational and environmental conditions.

Other objects and many of the attendant advantages of this invention will be readily appreciated as the same becomes better understood by reference to the following detailed description when considered in connection with the accompanying drawings.

FIG. 1 is a functional block diagram of an autopilot system showing multiple loop command tailoring; and FIG. 2 is a modification of the system of FIG. 1 showing combined loop command tailoring.

DESCRIPTION OF THE PREFERRED EMBODIMENTS

Figure 1:
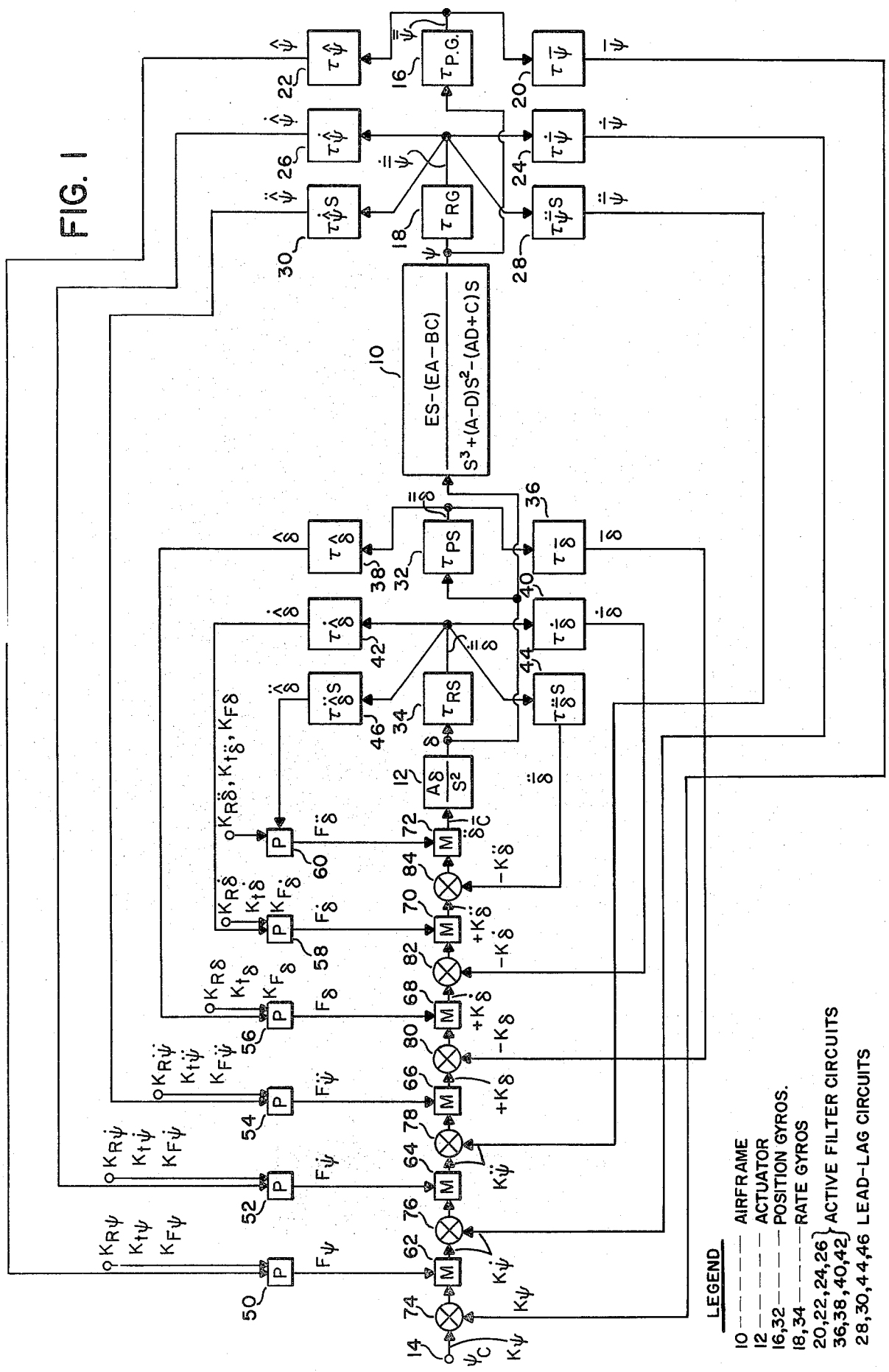

FIG. 1 is a block diagram which represents in simplified form the basic configuration of the command tailoring system, specifically an automatic flight control system which, for example, may be used to control the yaw of a high performance aircraft, it being understood that the principals may also apply to roll and pitch control axes of an aircraft. The typical flight control system of FIG. 1 comprises a flight vehicle 10 having an airframe transfer characteristic represented by $$\frac{ES - (EA - BC)}{S^3 + (A - D)S^2 - (AD + C)S}$$

where $A$ = Generalized aerodynamic normal force coefficient $B$ = Generalized aerodynamic incremental force coefficient $C$ = Generalized aerodynamic directional static stability coefficient $D$ = Generalized aerodynamic directional damping coefficient $E$ = Generalized aerodynamic directional control effectiveness coefficient $S$ = Laplace operator or time derivative $$(\text{i.e., } \dot{x} = \frac{dx}{dt} = SX)$$

is subject to movements induced by command actuator 12 in response to command signal, $\psi_c$ inserted at 14. The attitude position $\bar{\psi}$ of airframe 10 is sensed by position gyro 16 while the rate of change of position, $\dot{\psi}$, of airframe 10 is sensed by rate gyro 18. Position gyro 16 may be of any conventional type as for example, Model 34141, manufactured by Conrac Corporation while rate gyro 18 may be of any conventional type as for example, Model GG445, manufactured by Honeywell Incorporated. The output signal from position gyro 16 is fed to a first attitude position network 20 having transfer characteristic, $\tau_{\bar{\psi}}$, to provide a first measured airframe attitude position $\bar{\psi}$ and to a second attitude position network 22 having transfer characteristics, $\tau_{\ddot{\psi}}$ to provide a second measured airframe attitude position, $\ddot{\psi}$. The output signal from rate gyro 18 is fed to rate transfer networks 24 and 26 having transfer characteristics, $\tau_{\dot{\psi}}$ and $\tau_{\ddot{\psi}}$, to provide first and second airframe attitude rates $\dot{\psi}$ and $\ddot{\psi}$, respectively. Networks 20, 22, 24, and 26 may for example, be µA741 operational amplifiers connected as active second order lag or filter circuits in the conventional manner well known in the prior art. For example, see Modern Control System Theory and Application by Stanley Shinner (1972) Addison Wesley, Menlow Park, especially pp. 142–143, equation 4.3 and pp. 151–158, FIG. 4.6 and equation 5.2 and Control Engineer Handbook by John G. Truxal especially p. 125 and equation 9. Acceleration; transfer networks 28 and 30 having transfer characteristic, $\tau_{\dot{\psi}} S$ and $\tau_{\ddot{\psi}}$, provide first and second airframe attitude accelerations, $\dot{\psi}$ and $\ddot{\psi}$, respectively. Networks 28 and 30 may for example be µA741 operational amplifiers connected as active lead-lag circuits in the conventional manner well known in the prior art. For example see Analog Computation by Albert S. Jackson (1960) McGraw Hill, especially p. 638, equation 36.

The deflection position $\bar{\bar{\delta}}$ of control actuator 12 is sensed by position sensor 32 which by way of example may be a type 1319 potentiometer manufactured by ELECTRO-MEC Instrument Corp. while the rate of change of deflection, $\dot{\bar{\delta}}$, is sensed by rate sensor 34 which by way of example may be a Helipot DC tachometer, Model 9150. The output signal from position sensor 32 is fed to deflection position networks 36 and 38 having transfer characteristics $\tau_{\bar{\delta}}$ and $\tau_{\dot{\delta}}$, to provide first and second measured actuator deflection positions, $\bar{\delta}$ and $\dot{\delta}$, respectively. The output signal from rate sensor 34 is fed to rate transfer network 40 and 42 having transfer characteristics $\tau_{\bar{\delta}}^*$ and $\tau_{\dot{\delta}}^*$, to provide first and second actuator deflection rates, $\dot{\bar{\delta}}$ and $\dot{\delta}$, respectively. Networks 36, 38, 40 and 42 may for example be $\mu$A741 operational amplifiers connected as active second order lag or filter circuits in the conventional manner well known in the prior art. For example see the above referenced material of Stanley Shinner. Acceleration transfer networks 44 and 46 having transfer characteristics $\tau_{\bar{\delta}}^* S$ and $\tau_{\dot{\delta}}^* S$, provide actuator deflection acceleration, $\ddot{\bar{\delta}}$ and $\ddot{\delta}$, respectively. Network 44 and 46 may for example be $\mu$A741 operational amplifiers connected as lead-lag circuits in the conventional manner well known in the prior art. For example, see the above referenced material of Albert S. Jackson. Basic airframe attitude position, rate and acceleration control is implemented by comparing measured position rate and acceleration signals with command signals at comparators 74 through 84. Thus the measured airframe attitude position signal $\bar{\psi}$ is compared with the commanded airframe attitude position signal $\psi_c$ at comparator 74. The resulting attitude error signal multiplied by the appropriate attitude control gain factor K $\psi$ is used as the attitude rate command signal $\dot{\psi}_c$ and in a similar manner it is compared with the measured attitude rate signal $\dot{\bar{\psi}}$. Succeeding error and command signals are generated for interloops terminating with the inner error or actuator acceleration command signal $\ddot{\delta}_c$. Each of the comparators 74, 76, 78, 80, 82, 84 have gain factors of $+K_\psi$, $+K_{\dot{\psi}}$, $+K_{\ddot{\psi}}$, $\pm K_\delta$, $\pm K_{\dot{\delta}}$, and $\pm K_{\ddot{\delta}}$, respectively. Adaptive control is implemented by the use of signal processors and multiplying circuits.

A plurality of signal processors 50 through 60 compare the derived position, rate and acceleration signals from airframe 10 and actuator 12 with reference signals to provide gain signals for multiplying circuits 62 through 72. Processing circuits 50 through 60 should be of the type that solve equations of the following type:

$$F_\delta = 1 - K_{F_\delta} \overline{\Delta}_\delta,$$

where
$$1 \geq F_\delta \geq 0$$

or
$$\overline{\Delta}_\delta = [\Delta_\delta]_{t_{\delta}} - K_{t_\delta} t_\delta,$$

where, $t_{\delta_0}$ is time from $t_{\delta_0}$ and $t_{\delta_0}$ is the time point of last occurrence of $\Delta_\delta > [\overline{\Delta}_\delta]_{t_{\delta_0}}$ $\Delta_\delta = 0$, when $|\delta| \leq K_{R_\delta}$
$\Delta_\delta = |\delta| - K_{R_\delta}$, when $|\delta| > K_{R_\delta}$ Implementation of processors of this type is well known in the prior art using standard micro-circuit components such as the $\mu$A741 operational amplifiers, transistors, diodes and etc. Examples of this type of implementation are discussed in the above referenced publications of Albert S. Jackson, John G. Truxal and Control System Design by C. J. Savant (1964) McGraw Hill. The airframe attitude position signal, $\hat{\psi}$, is combined with attitude position reference signal, $K_{R_\psi}$, position adaptive gain time decay constant signal $K_{t_\psi}$, and position adaptive gain attenuation constant signal, $K_{F_\psi}$ to provide an airframe attitude position command adaptive gain signal to control multiplier circuit 62. In a similar manner the remainder of the rate and acceleration signals are combined with their respective rate and acceleration reference signals to provide gain control signals for the remainder of the multiplying circuits 64 through 72 All multiplying and comparator circuits are of conventional design well known in the prior art. For example the comparator circuits may be of the type shown in FIG. 2.4 of "Applications Manual for Operational Amplifiers" by Philbrick/Nexus Research and Multipliers, M, may be a Model 107C multiplier manufactured by Hybred Systems, Burlington, Mass.

In operation, the following nominal values for the generalized airframe equations have been found to be satisfactory, A (normal force coefficient) = 0.1
B (Incremental normal force coefficient) = 0.01
C (Directional static stability) = $-10.0$
D (Directional damping) = $-1.0$
E (Directional control effectiveness) = $-25.0$
then the other nominal values would be
$K_\psi$ (Attitude position feedback gain) = 40.0
$K_{\dot{\psi}}$ (Attitude rate feedback gain) = 10.0
$K_{\ddot{\psi}}$ (Attitude acceleration feedback gain) = 0.4
$K_\delta$ (Actuator deflection positioning feedback gain) = 1.0
$K_{\dot{\delta}}$ (Actuator deflection rate feedback gain) = 25.0

Figure 2:
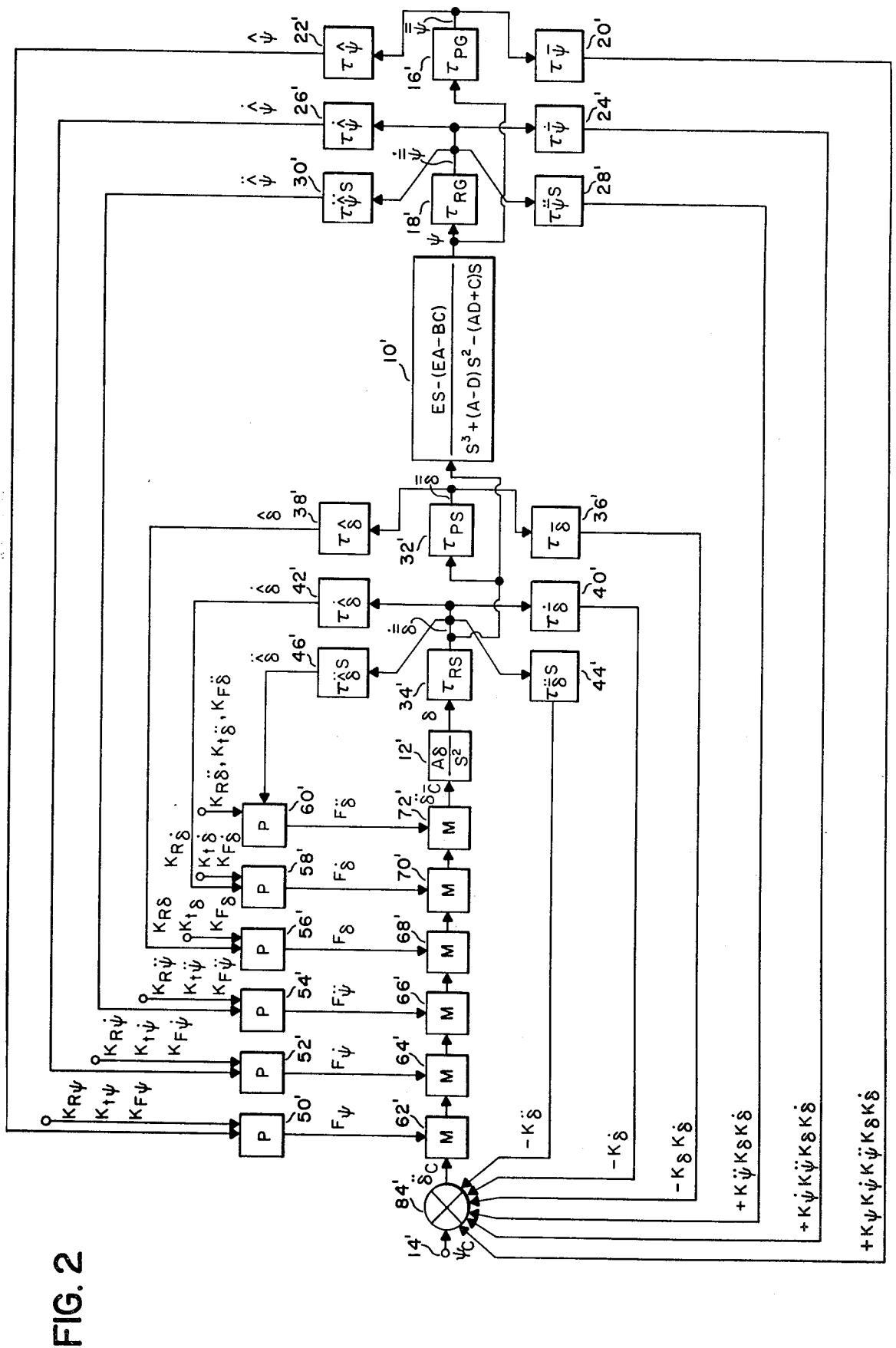

In the embodiment of FIG. 2, all of the bar signals representing the sensed parameters from actuator 12' and airframe 10' are collectively compared in comparator 84' with the input command signal $\psi_c$ at input 14'. Any error signal out of comparator 84' is successively multiplied in multiplying circuits 62' through 72' to provide a command signal, ($\ddot{\delta}_c = F_\psi \cdot F_{\dot{\psi}} \cdot F_{\ddot{\psi}} \cdot F_\delta \cdot F_{\dot{\delta}} \cdot F_{\ddot{\delta}} \cdot \ddot{\delta}_c$), to actuator 12. The remainder of the circuit function in the same manner as in FIG. 1 to control the gain of each of the multiplying circuits to obtain the desired tailoring of the command signal.

Obviously many modifications and variations of the present invention are possible in the light of the above teachings. It is therefore to be understood that within the scope of the appended claims the invention may be practiced otherwise than as specifically described.

What is claimed is:

1. An adaptive control means for a feedback control system in which at least one system function is varied by said adaptive control means to optimize the response of said system to a control input under widely varying operating conditions, said adaptive control means comprising:
   a. an airframe having controllable functions,
   b. command control input means for commanding a change in at least one of the controllable functions,
   c. reference signal means representing limits of said controllable functions,
   d. sensing means providing output signals representing the actual response of said airframe to said command control input means, e. means comparing said output signals with said command control input means for producing an error signal, f. means comparing said output signal means with said reference means for providing a control signal, g. means coupled to said error signal producing means and to said control signal providing means and being responsive to said control signal to prevent said error signal from effecting a change that would exceed the limits of said controllable functions.

2. The control system of claim 1 further comprising:

a. actuator means coupled to said error signal control means and being responsive to said error signal for changing at least one of said controllable functions, b. sensing means for providing output signals representing the repsonse of said actuator means to further control said error signal.

3. The control system of claim 2 wherein said airframe sensing means provides output signals representing the airframe position rate and acceleration functions, respectively, and said actuator sensing means provides a plurality of output signals representing actuator deflection position, rate and acceleration, respectively.

4. The control system of claim 3 wherein said error signal producing means includes a comparator circuit for each of said sensed signals.

5. The system of claim claim 4 wherein said control signal providing means includes a plurality of processing circuits equal to the number of said sensed signals, each of said processing circuits having a sensed signal input and a reference signal input so that a control signal is provided for each of the sensed signals.

6. The control system of claim 5 wherein said error signal control means includes a multiplying circuit equal to the number of said processing circuits.

7. The control system of claim 6 wherein each of said comparator circuits has a first input coupled to said airframe position sensor, said airframe position rate sensor, said airframe position acceleration sensor, said actuator deflection position sensor said actuator deflection position rate sensor and said actuator deflection position acceleration sensor, respectively, and a second input coupled to said command control input means and the output of one of said multiplying circuits, respectively.

8. The control system of claim 3 wherein said error signal producing means includes one comparator circuit for all of said sensed signals.

9. An adaptive control means for a feedback control system in which at least one system function is varied by said adaptive control means to optimize the response of said system to a control input under widely varying operating conditions, said adaptive control means comprising:

a. a device having controllable functions, b. command control input means for commanding a change in at least one of the controllable functions, c. reference signal means representing limits of said controllable functions, d. sensing means providing output signals representing the actual response of said device to said command control input means, e. means comparing said output signals with said command control input means for producing an error signal, f. means comparing said output signal means with said reference means for providing a control signal, g. means coupled to said error signal producing means and to said control signal providing means and being responsive to said control signal to prevent said error signal from effecting a change that would exceed the limits of said controllable functions.

* * * * *